(12) United States Patent
Boiger et al.

(10) Patent No.: US 11,085,524 B2
(45) Date of Patent: Aug. 10, 2021

(54) TRANSMISSION, DRIVE ASSEMBLY HAVING A TRANSMISSION, AND METHOD FOR OPERATING THE DRIVE ASSEMBLY

(71) Applicant: RENK AKTIENGESELLSCHAFT, Augsburg (DE)

(72) Inventors: Peter Boiger, Augsburg (DE); Burkhard Pinnekamp, Augsburg (DE)

(73) Assignee: Renk GmbH, Augsburg (DE)

( * ) Notice: Subject to any disclaimer, the term of this patent is extended or adjusted under 35 U.S.C. 154(b) by 0 days.

(21) Appl. No.: 16/478,887

(22) PCT Filed: Dec. 18, 2017

(86) PCT No.: PCT/DE2017/101082
§ 371 (c)(1),
(2) Date: Jul. 18, 2019

(87) PCT Pub. No.: WO2018/137730
PCT Pub. Date: Aug. 2, 2018

(65) Prior Publication Data
US 2019/0383384 A1    Dec. 19, 2019

(30) Foreign Application Priority Data

Jan. 27, 2017   (DE) .......................... 102017101650.3

(51) Int. Cl.
*F16H 3/48*         (2006.01)
*F16H 57/10*        (2006.01)
(Continued)

(52) U.S. Cl.
CPC .............. *F16H 57/10* (2013.01); *F16H 1/46* (2013.01); *F16H 3/48* (2013.01); *F16H 3/724* (2013.01);
(Continued)

(58) Field of Classification Search
CPC ............. F16H 3/727; F16H 2200/2007; F16H 2200/2033; F16H 2001/289;
(Continued)

(56) References Cited

U.S. PATENT DOCUMENTS

| | | | | |
|---|---|---|---|---|
| 7,037,230 | B2 * | 5/2006 | Dupriez | F16H 3/72 180/65.235 |
| 7,223,199 | B2 * | 5/2007 | Willmot | B60K 6/40 475/339 |
| 2010/0132637 | A1 * | 6/2010 | Barker | F02B 33/34 123/41.65 |
| 2012/0322602 | A1 * | 12/2012 | Kim | B60L 50/16 475/5 |

(Continued)

FOREIGN PATENT DOCUMENTS

| | | | | |
|---|---|---|---|---|
| CA | 2351240 A1 * | 12/2001 | ............... | F16H 3/72 |
| DE | 973 392 | 8/1960 | | |

(Continued)

OTHER PUBLICATIONS

Office Action dated Sep. 22, 2020 issued in Korean Patent Application No. 10-2019-7023265.

*Primary Examiner* — Roger L Pang
(74) *Attorney, Agent, or Firm* — Cozen O'Connor

(57) ABSTRACT

A transmission for a drive assembly for driving a working machine at a variable speed of rotation having: a first planet gear set to which a first drive unit can be coupled and a second planet gear set which the working machine can be coupled. The first planet gear set and the second planet gear set each having planet gears which are arranged on at least two common planet shafts which are mounted in a planet carrier. The planet carrier is rotatably mounted in a transmission housing and can be driven by a second drive unit. A torque on the planet carrier can be braced against the transmission housing via a brake or locking mechanism or clutch.

11 Claims, 2 Drawing Sheets

(51) Int. Cl.
*F16H 1/46* (2006.01)
*F16H 3/72* (2006.01)
*F16H 37/04* (2006.01)
*F16H 1/28* (2006.01)

(52) U.S. Cl.
CPC ........... *F16H 3/727* (2013.01); *F16H 37/041* (2013.01); *F16H 2001/289* (2013.01); *F16H 2001/2881* (2013.01); *F16H 2200/2007* (2013.01); *F16H 2200/2033* (2013.01); *F16H 2714/02* (2013.01)

(58) Field of Classification Search
CPC .... F16H 2001/2881; F16H 3/48; F16H 57/10; F16H 3/724
USPC .... 475/150, 5, 338, 339, 323, 340, 341, 342
See application file for complete search history.

(56) References Cited

U.S. PATENT DOCUMENTS

| | | | | |
|---|---|---|---|---|
| 2016/0091061 | A1* | 3/2016 | Erjavec | H02K 7/116 475/2 |
| 2016/0327134 | A1* | 11/2016 | Boiger | F16H 3/724 |
| 2018/0126836 | A1* | 5/2018 | Waldner | H02P 5/753 |

FOREIGN PATENT DOCUMENTS

| | | | |
|---|---|---|---|
| DE | 102011087109 B3 | 4/2013 | |
| DE | 10 2015 006084 | 11/2016 | |
| EP | 1 484 532 | 12/2004 | |
| GB | 2429342 A * | 2/2007 | ............. F03D 15/00 |
| KR | 1020160031348 | 3/2016 | |
| WO | WO 2012/140664 | 10/2012 | |
| WO | WO 2014/183139 | 11/2014 | |
| WO | WO 2016/172742 | 11/2016 | |

* cited by examiner

TRANSMISSION, DRIVE ASSEMBLY HAVING A TRANSMISSION, AND METHOD FOR OPERATING THE DRIVE ASSEMBLY

CROSS REFERENCE TO RELATED APPLICATIONS

This is a U.S. national stage of application No. PCT/DE2017/101082, filed on Dec. 18, 2017. Priority is claimed on German Application No. DE102017101650.3, filed Jan. 27, 2017, the content of which is incorporated here by reference.

BACKGROUND OF THE INVENTION

1. Field of the Invention

The invention relates to a transmission for a drive arrangement of a machine for driving the machine with variably adjustable rotational speed. The invention, furthermore, relates to a drive arrangement having a transmission and a machine to be driven with variably adjustable rotational speed and to a method for operating the drive arrangement.

2. Description of the Prior Art

From practice applications are known in which a machine such as for example a compressor or a pump has to be operated with a variably adjustable rotational speed. According to practice, when the machine is not a rotational speed-variable turbine or an internal combustion engine, either electric motors with frequency converter are employed as drive units or a transmission with a mechanical modulation branch is employed for this purpose, with which a transmission ratio that is variable in the required range can be provided. Both possibilities for driving a machine with variably adjustable rotational speed known from practice are involved and expensive.

From DE 10 2015 006 084 A1 a transmission for a drive arrangement of a machine for driving the machine with variably adjustable rotational speed is known.

SUMMARY OF THE INVENTION

One aspect of the present invention is a new type of transmission, a drive arrangement having such a transmission, and a method for operating such a drive arrangement, with the help of which the power loss of the same can be reduced and the efficiency increased.

According to one aspect of the invention, a torque on the planet carrier can be braced against the transmission housing via a brake or locking device or coupling. The brake or locking device or coupling is preferentially assigned to the second drive unit and interacts with the same. The second drive unit designed as modulation motor can thus be braked or locked. Then, the modulation motor need no longer be supplied with energy as a result of which the power loss can be reduced and the efficiency increased. Furthermore, the operating flexibility can be increased.

According to an advantageous further development, the torque on the planet carrier can be directly braced against the transmission housing via the brake, locking device, or coupling preferentially in such a manner that the planet carrier can be connected to the housing in a torque-proof manner via the brake, locking device, or coupling. By way of this, a power loss can be particularly advantageously reduced and the efficiency particularly advantageously increased. Furthermore, the operating flexibility can be particularly advantageously increased by way of this.

Preferentially, the brake, locking device, or coupling is arranged on that shaft of the transmission connected to the second drive unit. This design of the transmission is particularly advantageous for reducing power loss and increasing the efficiency and operating flexibility.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

One aspect of the invention relates to a transmission for a drive arrangement of a machine for driving the machine with variably adjustable rotational speed. An aspect of the invention, furthermore, relates to a drive arrangement of a machine to be driven with variably adjustable rotational speed and to a method for operating such a drive arrangement.

Figure 1:
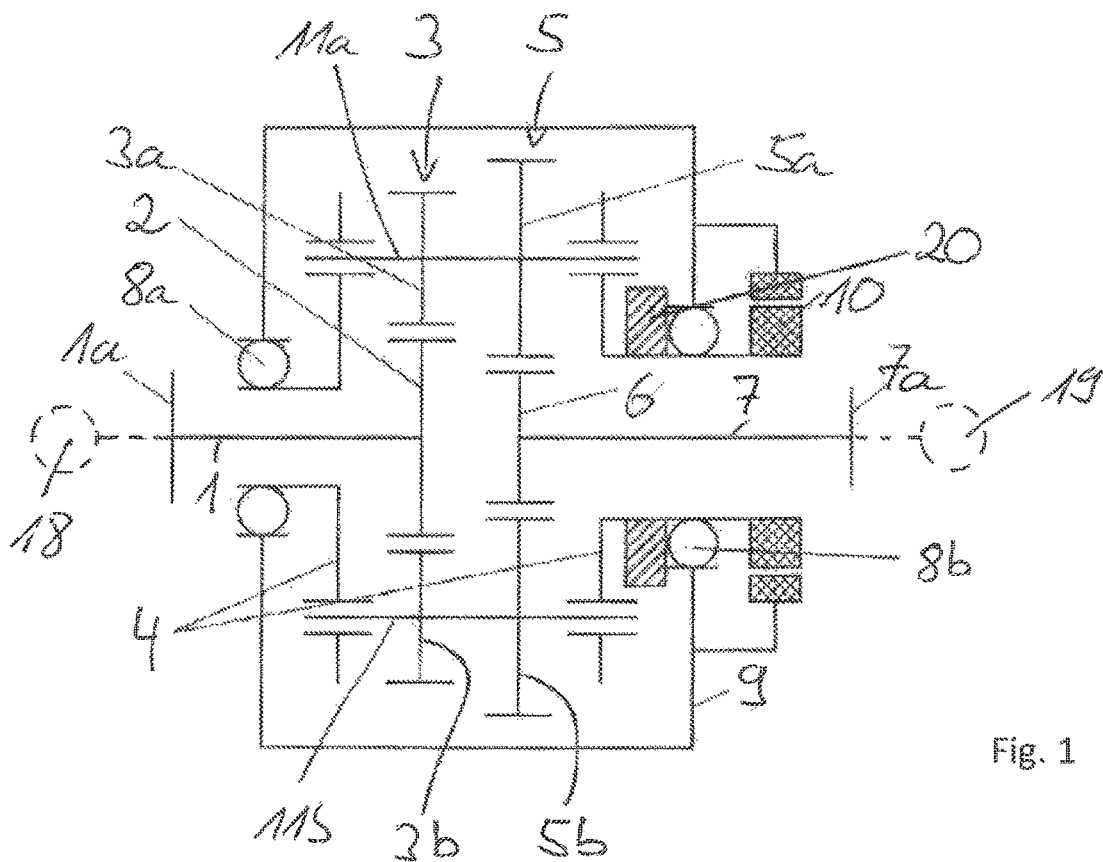
FIG. 1: is a blocking device diagram of a transmission or a corresponding drive arrangement.

FIG. 1 shows a preferred exemplary embodiment of a transmission or a drive arrangement for a machine for driving the machine with variably adjustable rotational speed.

The transmission of FIG. 1 comprises a first planetary gear set 3, wherein a shaft 1 of the transmission is directly coupled to the first planetary gear set 3. A first drive unit 18 can be directly coupled to the shaft 1, which is coupled to the first planetary gear set 3, in particular via a shaft flange 1a of this shaft 1.

The first drive unit 18 is a so-called main drive. The main drive can be preferentially operated with a constant rotational speed.

Furthermore, the transmission 1 of FIG. 1 comprises a second planetary gear set 5. The second planetary gear set 5 is directly coupled to a further shaft 7 of the transmission 1, wherein the machine 19 to be driven with variably adjustable rotational speed can be directly coupled to this shaft 7, in particular to a shaft flange 7a of the shaft 7.

The first planetary gear set 3 and the second planetary gear set 5 each comprise planet gears 3a, 3b and 5a, 5b respectively, which are arranged on at least two common planet shafts 11a, 11b. Accordingly, two planet shafts 11a, 11b are shown in FIG. 1, wherein the planet gears 3a and 5a of the planetary gear sets 3, 5 are arranged on the planet shaft 11a and the planet gears 3b, 5b of the planetary gear sets 3, 5 are arranged on the planet shaft 11b. It is pointed out that more than two such planet shafts 11a, 11b with planet gears arranged on the same can be present, for example three or four planet shafts with corresponding planet gears.

The planet shafts 11a, 11b are rotatably mounted in a planet carrier 4. The planet carrier 4 is not connected fixed to the housing; the planet carrier 4 is rather rotatably mounted in a transmission housing 9, wherein FIG. 1 shows rolling bearings 8a, 8b via which the planet carrier 4 is rotatably mounted in the planet housing 9.

The second drive unit 10 is a so-called modulation drive.

In the exemplary embodiment of FIG. 1, the first drive unit 18, which via the shaft flange 1a directly acts on the shaft 1 of the transmission, can be directly coupled to a sun gear 2 of the first planetary gear set 3 via the shaft, wherein this first drive unit 18, via the sun gear 2, drives into the planet gears 3a, 3b of the first planetary gear set 3 arranged on the planet shafts 11a, 11b.

Because of this, the planet shafts 11a, 11b and thus also the planet gears 5a, 5b of the second planetary gear set 5 are driven, wherein the second planetary gear set 5 comprises a sun gear 6 which is driven via the planet gears 5a, 5b of the second planetary gear set 5. This sun gear 6 of the second planetary gear set 5 is coupled to the shaft 7 and via the shaft 7 to the machine 19 which is to be driven with variably adjustable rotational speed.

In FIG. 1, the planet gears 3a, 3b of the first planetary gear set 3 mesh into the sun gear 2 of the first planetary gear set 3, whereas the planet gears 5a, 5b of the second planetary gear set 5 mesh into the sun gear 6 of the second planetary gear set 5. In a drive arrangement, in which the transmission shown in FIG. 1 is employed, the first drive unit 18 accordingly acts on the shaft 1, the second drive unit 10 acts on the planet carrier 4 and the machine 19 to be driven with variably adjustable rotational speed acts on the shaft 7.

The first drive unit 18, the so-called main drive, which acts on the shaft 1, is preferentially a drive unit to be driven with a constant rotational speed.

The second drive unit 10, the so-called modulation drive, which acts on the planet carrier 4, is preferentially a drive unit to be driven with a variable rotational speed.

Accordingly, a part of the power for driving the machine 19 is provided by the first drive unit 18 acting on the flange 1a and thus on the shaft 1, which is preferentially operated with a constant rotational speed. Depending on the rotational speed of the machines 19, the rest is provided by the drive unit 10. Here, both directions of rotation are provided and the part output can be positive, i.e. acting as motor, and negative, i.e. acting as generator.

In FIG. 1, this first drive unit 18 drives into the planet gears 3a, 3b via the sun gear 2 of the first planetary gear set 3 and thus into the planet shafts 11a, 11b, with which the planet gears 3a, 3b are non-rotatably connected. Likewise, the planet gears 5a, 5b of the second planetary gear set 5 are non-rotatably connected to the planet shafts 11a, 11b which in turn drive into the sun gear 6 of the second planetary gear set 5 in order to ultimately provide the part of the drive power provided by the first drive unit 18 to the machine 19 to be driven with variable rotational speed.

As already explained, the planet shafts 11a, 11b are mounted in the planet carrier 4. The planet carrier 4 is rotatably mounted in the transmission housing 9 via rolling bearings 8a, 8b and thus driveable.

The drive of the planet carrier 4 is effected via the second drive unit 10, whose rotational speed or drive power is superimposed on the rotational speed or drive power of the first drive unit 18 acting on the shaft 1. As already explained, the first drive unit 18, which acts on the shaft 1, is preferentially driven with a fixed or constant rotational speed whereas the second drive unit 10, which acts on the planet carrier 4, is preferentially driven with a variable rotational speed.

Both drive units 18, 10 are preferentially electric motors.

In the exemplary embodiment of FIG. 1, the second drive unit 10 is embodied as a hollow shaft motor directly attached to the planet carrier 4.

A transmission stage can also be connected between the second drive unit 10 and the planet carrier 4.

A part of the drive power is introduced into the arrangement on the flange 1a by the first drive unit 18 that is preferentially operated with a constant rotational speed and designed as electric motor. By way of the drive-side sun gear 2, at least two, preferentially three or four planet shafts are driven via their pinions. The planet shafts 11a, 11b are mounted in the planet carrier 4. The planet gears 5a, 5b combine the output to the common output-side sun gear 6 which drives the machine 19 designed as compressor or pump. The planet carrier 4 is not fixed in place but mounted in the transmission housing 9 with the bearings 8a, 8b and thus rotatable. By driving this planet carrier 4 with second drive unit 10 designed as electric motor, which can be preferentially operated with a variable rotational speed, a further rotational speed is superimposed on the first drive rotational speed of the first drive unit 18 and thus an adjustable output rotational speed achieved. In FIG. 1, the second drive unit 10 as hollow shaft motor is directly attached to the planet carrier 4. The drive can also be effected via a transmission stage.

According to one aspect of the invention, a brake 20, a locking device, or a coupling is provided, via which a torque on the planet carrier 4 can be braced against the transmission housing 9. By way of the brake 20, the locking device, or the coupling, torque on the planet carrier 4 can be directly braced against the transmission housing 9. Accordingly, the brake 20, the locking device, or the coupling is connected between the carrier 4 and the transmission housing 9. The planet carrier 4 can be connected in a torque-proof manner to the housing 9 via the brake 20, the locking device, or the coupling. The brake 20, the locking device, or the coupling is assigned to the second drive unit 10 and interacts with the same.

In particular when a drive of the or a drive arrangement is to be exclusively effected via the first drive unit 18, a torque on the planet carrier 4 is braced against the transmission housing 9 via the brake 20, the locking device, or the coupling. The second drive unit 10 is then preferentially connected torque-free. Here, the second drive unit 10 is preferentially disconnected and thus currentless.

Accordingly, the planet carrier 4 can be connected to the housing 9 in a torque-proof manner with the help of the brake 20 or locking device or coupling. Here, the second drive unit 10 can be switched current-free. The drive is then exclusively effected via the first drive unit 10 with fixed transmission ratio on the output and thus on the machine 19 predetermined by the transmission.

In FIG. 1, the brake 20, the locking device, or the coupling is preferentially arranged on that shaft of the transmission, which is connected to the second drive unit 10, in FIG. 1 on the planet carrier 4 that is rotatably mounted in the housing 9. Thus, a particularly efficient operation while reducing power loss is possible during which the second drive unit 10 can be switched off as soon as the brake 20, the locking device, or the coupling is active.

By way of the brake 20, the locking device, or the coupling a safety gain is additionally provided in the event that the second drive unit 10 should fail.

As coupling, a mechanical coupling for example claw coupling or a mechanical locking device, for example by way of retaining pins, can be employed, as a result of which the design effort can be reduced. In contrast with a brake, such a coupling however can only be switched in the stationary state of the drive arrangement.

The second drive unit 10 is preferentially operated in two directions of rotation. When the second drive unit 10 is only operated in one direction of rotation, a non-rotation return device or the like can be employed as a brake so that when the second drive unit 10 is switched off, the torque is automatically braced via the non-return device.

Figure 2:
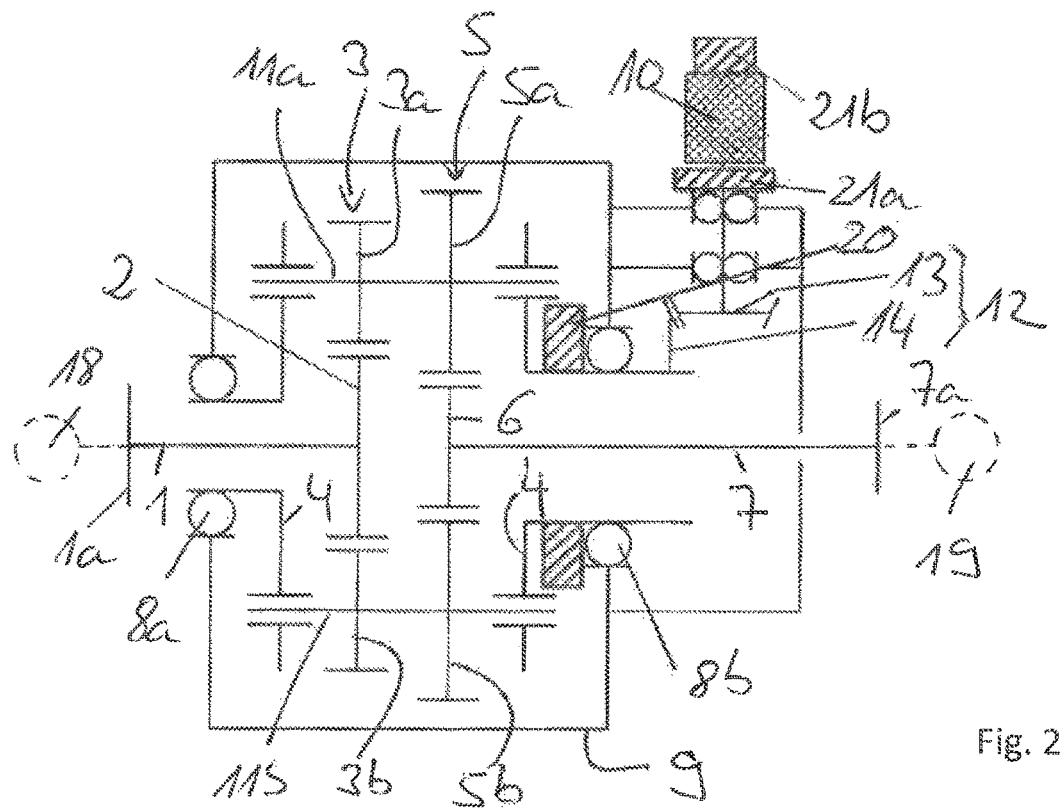
FIG. 2: is a blocking device diagram of a transmission or a corresponding drive arrangement.

FIG. 2 shows a modification of the transmission or of the drive arrangement of FIG. 1, in which the second drive unit 10 is coupled to the planet carrier 4 of the transmission 1 via a bevel gear stage 12, wherein the bevel gear stage 12 comprises a bevel gear 14 and a bevel pinion shaft 13. In addition to the brake 20, the locking device, or the coupling, which is connected between the planet carrier 4 and the housing 9, at least one further brake 21a, 21b, locking device, or coupling is provided in FIG. 2, which is assigned to the drive shaft of the second drive unit 10 or that shaft of the transmission into which the second drive unit 10 drives. By way of this, the operational safety can be increased in particular by providing redundancy.

Figure 3:
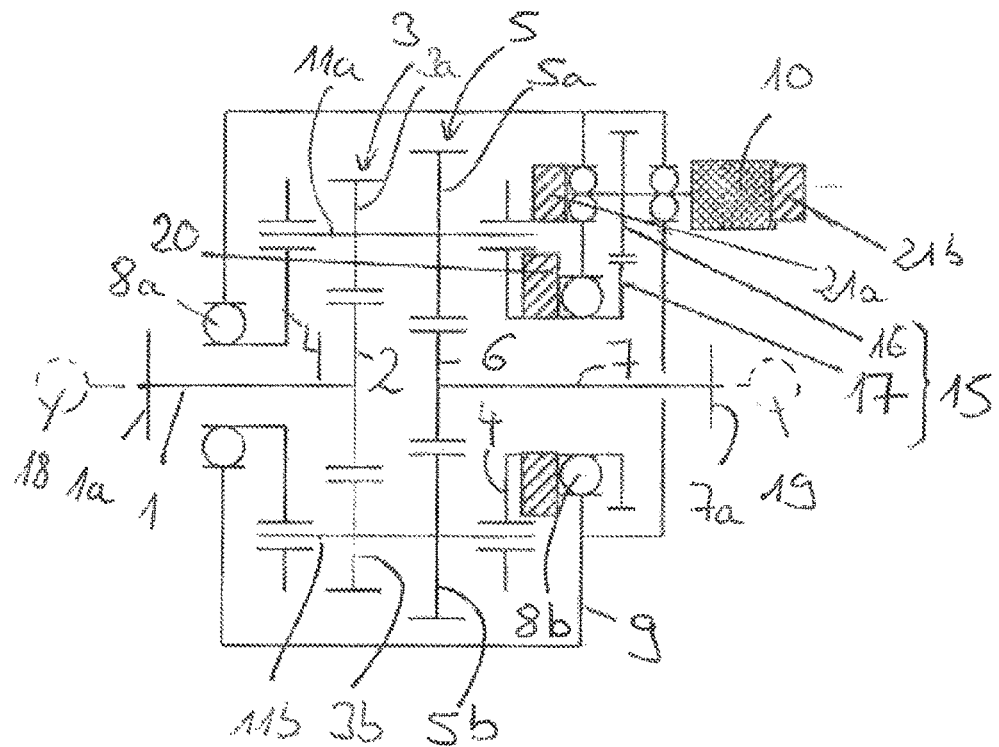
FIG. 3: is a blocking device diagram of a transmission or a corresponding drive arrangement.

FIG. 3 shows a further modification of the transmission or of the drive arrangement, in which the second drive unit 10 is coupled to the planet carrier 4 of the transmission via a spur gear stage 15 with spur gear 17 and pinion shaft 16, in order to drive the same. At least one further brake 21a, 21b, locking device, or coupling is also provided in FIG. 3 in addition to the brake 20, the locking device, or the coupling, which is connected between the planet carrier 4 and the housing 9, which is assigned to the drive shaft of the second drive unit 10 or that shaft of the transmission into which the second drive unit 10 drives. By way of this, the operational safety can again be increased in particular by providing redundancy.

As already explained, the rotational speed of the planet carrier 4 is variably adjustable via the second drive unit 10, as a result of which an output rotational speed that is variably adjustable in a range is achieved on the shaft 7 for driving the machine 19, namely by superimposing the rotational speed or drive power of the rotational speed or drive power provided on the shaft 1 by the first drive unit 18 on the rotational speed or drive power of the second drive unit 10.

Figure 4:
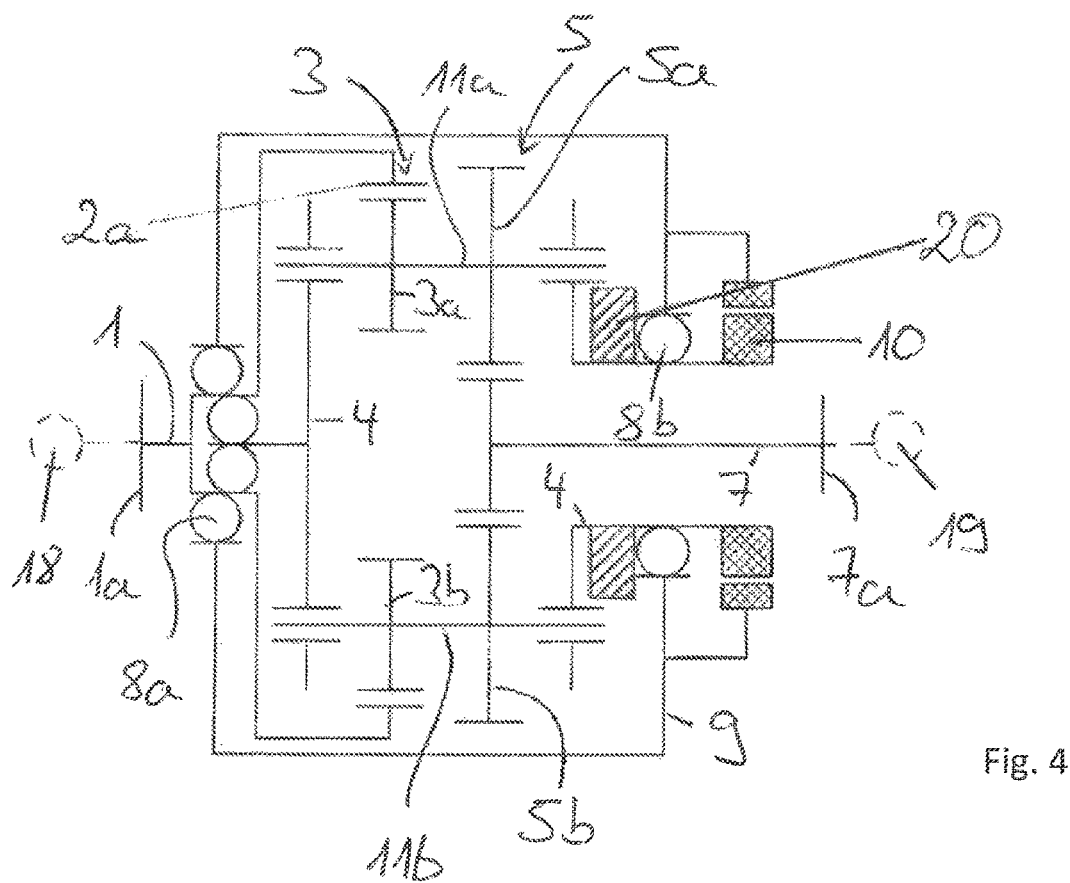
FIG. 4: is a blocking device diagram of a transmission or a corresponding drive arrangement.

A further version of a transmission according to the invention is shown by FIG. 4, wherein the exemplary embodiment of FIG. 4 differs from the exemplary embodiment of FIG. 1 in that the drive power provided on the shaft 1 by the first drive unit 18 does not drive the planet gears 3a, 3b of the first planetary gear set 3 via a sun gear but rather via an internal gear 2a of the first planetary gear set 3. With respect to all remaining details, the exemplary embodiment of FIG. 4 corresponds to the exemplary embodiment of FIG. 1. Although not shown, a transmission stage in the form of a bevel gear stage 12 or spur gear stage 15 can also be connected in the exemplary embodiment of FIG. 4 between the second drive unit 10 and the planet carrier 4 in agreement with the exemplary embodiments of FIGS. 2 and 3. In this embodiment, higher transmission ratios of the rotational speeds of the shafts 1 and 7 compared with the previous exemplary embodiments are made possible.

The transmissions according to aspects the invention are embodied as modulation transmissions. The shown transmissions are each differential gears having two planetary gear sets 3, 5, wherein the transmission is connected between two drive units 18, 10 and a machine in order to drive the machine 19 with variable adjustable rotational speed. One of the drive units is driven with a constant rotational speed and the other drive unit is preferentially driven with a variable rotational speed. Although not preferred it is also possible to embody both drive units with variably adjustable rotational speed. In the shown exemplary embodiments, the first drive unit 18 drives into the planet gears 3a, 3b of the first planetary gear stage 3 either via a sun gear 2 or an internal gear 2a. The second drive unit 10 in each case drives into the planet carrier 4 rotatably mounted in the housing 9. The output is effected via the second planetary gear set 5 of the transmission towards the machine 19. By way of a brake 20 or locking device or coupling, a torque on the planet carrier 4 can be braced against the transmission housing 9.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A transmission for a drive arrangement of a machine configured to drive the machine with a variably adjustable rotational speed, comprising:
   a first planetary gear set to which a first drive unit can be coupled;
   a second planetary gear set, to which the machine can be coupled;
   a planet carrier rotatably mounted in a transmission housing and driveable by a second drive unit;
   wherein the first planetary gear set and the second planetary gear set each comprise respective planet gears arranged on at least two common planet shafts, which are mounted in the planet carrier;
   rolling bearings via which the planet carrier is rotatably mounted in the transmission housing; and
   at least one of one brake, a locking device, and a coupling via which a torque on the planet carrier configured to be directly braced against the transmission housing and accordingly is switched between the planet carrier and the transmission housing,
   wherein the at least one of the one respective brake, the locking device, and the coupling via which a torque on the planet carrier is configured to be braced against the transmission housing when the second drive unit is switched torque-free, and
   wherein the first drive unit is configured to operate when the brake is braced against the housing when second drive unit is switched torque-free.

2. The transmission according to claim 1, wherein via the at least one of the one respective brake, the locking device, and the coupling, the torque on the planet carrier is directly braced against the transmission housing.

3. The transmission according to claim 1, wherein the planet carrier is configured to be connected to the transmission housing via the at least one of the one respective brake, the locking device, and the coupling in a torque-proof manner.

4. The transmission according to claim 1, wherein the one brake is configured such that upon a failure of a respective drive unit a bracing of the torque is effected.

5. The transmission according to claim 4, wherein the one brake is embodied as one of an automatically switching non-return device and a synchronous coupling.

6. The transmission according to claim 1,
wherein a rotational speed the second drive unit coupled is configured to be superimposed on a rotational speed that is dependent on a rotational speed of the first drive unit,
wherein the first drive unit and/or the second drive unit can be driven with variably adjustable rotational speed.

7. A transmission for a drive arrangement of a machine configured to drive the machine with a variably adjustable rotational speed, comprising:
a first planetary gear set to which a first drive unit can be coupled;
a second planetary gear set, to which the machine can be coupled;
a planet carrier rotatably mounted in a transmission housing and driveable by a second drive unit;
wherein the first planetary gear set and the second planetary gear set each comprise respective planet gears arranged on at least two common planet shafts, which are mounted in the planet carrier; and
at least one of one brake, a locking device, and a coupling via which a torque on the planet carrier configured to be directly braced against the transmission housing and accordingly is switched between the planet carrier and the transmission housing,
wherein the second drive unit is a hollow shaft motor which is directly attached to the planet carrier,
wherein the respective at least one of the one respective brake, the locking device, and the coupling is arranged on a shaft of the transmission and accordingly on the planet carrier, which is connected to the second drive unit.

8. A transmission for a drive arrangement of a machine configured to drive the machine with a variably adjustable rotational speed, comprising:
a first planetary gear set to which a first drive unit can be coupled;
a second planetary gear set, to which the machine can be coupled;
a planet carrier rotatably mounted in a transmission housing and driveable by a second drive unit;
wherein the first planetary gear set and the second planetary gear set each comprise respective planet gears arranged on at least two common planet shafts, which are mounted in the planet carrier; and
at least one of one brake, a locking device, and a coupling via which a torque on the planet carrier configured to be directly braced against the transmission housing and accordingly is switched between the planet carrier and the transmission housing,
wherein the second drive unit is attached to the planet carrier via one of a bevel gear stage and a via a spur gear stage,
wherein a drive shaft of the second drive unit and/or a shaft of the transmission, which is connected to the second drive unit, is assigned one of a further brake, a further locking device, a further coupling via which torque can be braced.

9. A drive arrangement of a machine to be driven with variably adjustable rotational speed, comprising:
a transmission comprising:
a first planetary gear set to which a first drive unit can be coupled;
a second planetary gear set, to which the machine can be coupled;
a planet carrier rotatably mounted in a transmission housing and driveable by a second drive unit;
wherein the first planetary gear set and the second planetary gear set each comprise respective planet gears arranged on at least two common planet shafts, which are mounted in the planet carrier; and
at least one of one brake, a locking device, and a coupling via which a torque on the planet carrier can be directly braced against the transmission housing and accordingly is switched between the planet carrier and the transmission housing having the first drive unit coupled to the first planetary gear set of the transmission,
wherein the at least one of the one respective brake, the locking device, and the coupling via which a torque on the planet carrier is configured to be braced against the transmission housing when the second drive unit is switched torque-free, and
wherein the first drive unit is configured to operate when the brake is braced against the housing when second drive unit is switched torque-free;
a machine coupled to the second planetary gear set of the transmission;
the second drive unit coupled to the planet carrier of the transmission whose rotational speed can be superimposed on a rotational speed that is dependent on the rotational speed of the first drive unit,
wherein the first drive unit and/or the second drive unit can be driven with variably adjustable rotational speed.

10. A method for operating a drive arrangement having a transmission including a first planetary gear set to which a first drive unit can be coupled; a second planetary gear set, to which the machine can be coupled; a planet carrier rotatably mounted in a transmission housing and driveable by a second drive unit; wherein the first planetary gear set and the second planetary gear set each comprise respective planet gears arranged on at least two common planet shafts, which are mounted in the planet carrier;
and at least one of one brake, a locking device, and a coupling via which a torque on the planet carrier can be directly braced against the transmission housing and accordingly is switched between the planet carrier and the transmission housing having a first drive unit coupled to the first planetary gear set of the transmission; a machine coupled to the second planetary gear set of the transmission; the second drive unit coupled to the planet carrier of the transmission whose rotational speed can be superimposed on a rotational speed that is dependent on the rotational speed of the first drive unit, wherein the first drive unit and/or the second drive unit can be driven with variably adjustable rotational speed, comprising:
exclusively effecting a drive of the drive arrangement via the first drive unit; and
bracing a torque on the planet carrier against the transmission housing via the at least one of the one respective brake, the locking device, and the coupling.

11. The method according to claim 10, wherein when via the at least one of the one respective brake, the locking device, and the coupling a torque on the planet carrier is braced against the transmission housing, the second drive unit is switched torque-free.

* * * * *